United States Patent [19]

Maass et al.

[11] Patent Number: 5,418,451
[45] Date of Patent: May 23, 1995

[54] APPARATUS FOR MEASURING AT LEAST ONE STATE VARIABLE OF A BRUSHLESS DIRECT-CURRENT MOTOR

[75] Inventors: Jürgen Maass, Wiesloch; Helmut Meyer, Weinheim; Jürgen Seeberger, Rattelsdorf, all of Germany

[73] Assignee: Heidelberger Druckmaschinen AG, Heidelberg, Germany

[21] Appl. No.: 977,110

[22] Filed: Nov. 16, 1992

[30] Foreign Application Priority Data

Nov. 15, 1991 [DE] Germany .................. 41 37 559.9

[51] Int. Cl.⁶ .............................................. G01R 11/04
[52] U.S. Cl. ........................... 324/158.1; 324/117 H; 324/117 R; 318/254; 318/138; 318/362
[58] Field of Search .............. 73/362; 324/158 MG, 324/117 H, 117 R; 318/254, 138, 362

[56] References Cited

U.S. PATENT DOCUMENTS

| | | | |
|---|---|---|---|
| 3,738,175 | 6/1973 | Linsig | 73/362 |
| 4,135,120 | 1/1979 | Hoshimi et al. | 318/138 |
| 4,270,074 | 5/1981 | Duckworth et al. | 318/241 |
| 4,547,713 | 10/1985 | Langley et al. | 318/254 |
| 4,897,584 | 1/1990 | Grützmacher et al. | 318/471 |

FOREIGN PATENT DOCUMENTS

| | | |
|---|---|---|
| 0284711 | 10/1988 | European Pat. Off. . |
| 3205460 | 2/1983 | Germany . |
| 3803597 | 8/1989 | Germany . |
| 59-108960 | 6/1984 | Japan . |
| 622846 | 6/1985 | Japan . |
| 1353040 | 5/1974 | United Kingdom . |
| 1369658 | 10/1974 | United Kingdom . |
| 8907247 | 8/1989 | WIPO . |

OTHER PUBLICATIONS

Publication IECON '85; CH2160-0/85/0000-0697; 1985 IEEE; Kasim M. Al-Aubidy: "Microprocessor—Based New Measurement Technique of Angular Velocity for Real Time Applications".

*Primary Examiner*—Louis Arana
*Assistant Examiner*—Barry C. Bowser
*Attorney, Agent, or Firm*—Herbert L. Lerner; Laurence A. Greenberg

[57] ABSTRACT

An apparatus for measuring at least one state variable of a brushless direct-current motor includes 2 * n pole segments, wherein n=1, 2, 3, etc.. The pole segments are integral with a rotor of a brushless direct-current motor and are formed of permanently magnetic material generating a magnetic field. At least one Hall-effect element supplies an output voltage and is disposed in the vicinity of the rotor for impressing the magnetic field of the permanently magnetic segments on the output voltage from the at least one Hall-effect element. A logic unit receives the output voltage from the at least one Hall-effect element for determining the temperature of the brushless direct-current motor.

12 Claims, 7 Drawing Sheets

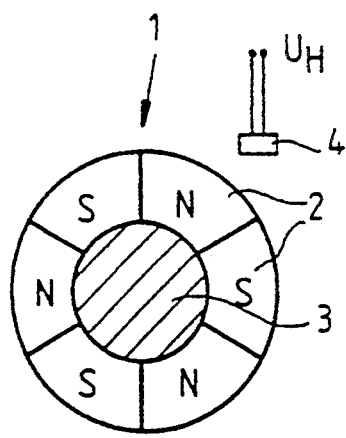
FIG. 1
FIG. 2a
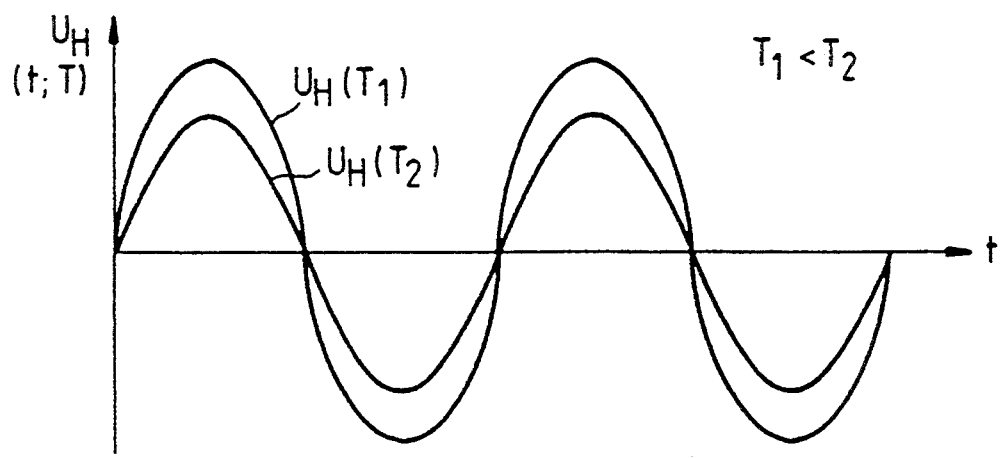
FIG. 2b
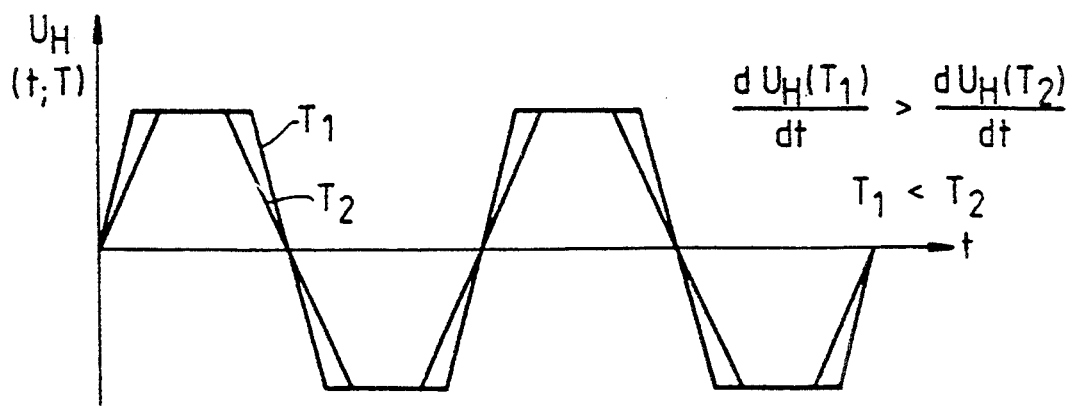

APPARATUS FOR MEASURING AT LEAST ONE STATE VARIABLE OF A BRUSHLESS DIRECT-CURRENT MOTOR

SPECIFICATION

The invention relates to an apparatus for measuring at least one state variable of a brushless direct-current motor.

In order to specify the rated values of a brushless direct-current motor, particularly the maximum load torque under different extreme service conditions, it is necessary to have precise knowledge of the temperature of the brushless direct-current motor. Various temperature-measuring apparatuses have become known for determining the temperature of a brushless direct-current motor, particularly for determining the temperature of a phase winding of a brushless direct-current motor.

A common method is that of determining the winding temperature of a brushless direct-current motor by means of a temperature-measuring sensor. For example, such a sensor may be a PTC (positive temperature coefficient) or an NTC (negative temperature coefficient) resistor. However, a disadvantage of such a measuring method is that the temperature is determined only at the point at which the sensor is positioned. In order to detect any excessive local temperatures in other regions of the winding, it is necessary to provide a plurality of such sensors, which may likewise be viewed as a disadvantage, because of the additional outlay for equipment.

Published European Application No. 0 284 711, corresponding to U.S. Pat. No. 4,897,584, discloses an apparatus for measuring the winding temperature of a brushless direct-current motor. The apparatus makes use of the effect whereby the resistance of a phase winding of a brushless direct-current motor changes as a function of temperature. A resistance measurement is performed on a phase winding whenever the phase winding is in the de-energized state. As soon as there is a corresponding commutation signal, the measurement is performed. The measured value is compared with a corresponding value of the motor when in the cold state. The change in the ohmic resistance, compared to the resistance of the phase winding in the initial state, provides a measure of the change in temperature of the motor. Various methods have been proposed for determining the resistance of the phase winding in a de-energized phase. For example, a pulse generator may be provided which supplies a voltage pulse during the de-energized phase of the winding. The ohmic resistance of the winding is then determined on the basis of the resulting current waveshape, with the ohmic resistance, in turn varying as a function of temperature.

It is accordingly an object of the invention to provide an apparatus for measuring at least one state variable of a brushless direct-current motor, which overcomes the hereinafore-mentioned disadvantages of the heretofore-known devices of this general type and which makes it possible to measure at least one state variable of a motor while in operation.

With the foregoing and other objects in view there is provided, in accordance with the invention, an apparatus for measuring at least one state variable of a brushless direct-current motor, comprising 2 * n pole segments (n=1, 2, 3, ...) being integral with a rotor of a brushless direct-current motor and being formed of permanently magnetic material generating a magnetic field; at least one Hall-effect element supplying an output voltage and being disposed in the vicinity of the rotor for impressing the magnetic field of the permanently magnetic segments on the at least one Hall-effect element; and a logic unit receiving the output voltage from the at least one Hall-effect element for determining the temperature of the brushless direct-current motor.

The apparatus according to the invention makes use of the effect wherein the magnetization properties of a permanently magnetic material exhibit a material-specific temperature-dependence below the Curie temperature $T_c$. Through the selection of a permanently magnetic material that reacts with suitable sensitivity to changes in temperature within a specified temperature range, it is possible to optimally determine temperature changes and to optimally perform absolute temperature measurements.

The changes in the magnetization properties of the permanently magnetic material, which are caused by temperature changes, are impressed on the output voltage from the Hall-effect element. In choosing the Hall-effect element, it must be ensured that the Hall-effect element is not operated in the saturation state, particularly when measuring in the cold state. However, If the at least one Hall-effect element is operated in the saturation state, it is also possible to use the slope of the output voltage from the Hall-effect element or elements to determine the temperature.

In accordance with another feature of the invention, the logic unit compares the measured maximum or minimum output voltage from the at least one Hall-effect element with the stored maximum or minimum output voltage from the the at least one Hall-effect element in a defined initial state, and determines a temperature change of the brushless direct-current motor with respect to the initial state, from a comparison of the difference of the corresponding output voltages with stored characteristic curves.

In accordance with a further feature of the invention, the 2 * n pole brushless direct-current motor (n=1, 2, 3, ...) is associated with n Hall-effect elements under defined angular positions, and through the use of logical operations on the output signals from the Hall-effect elements, the logic unit determines the respective angular position of the rotor. The commutation of the phase windings is controlled according to the determined angular positions of the rotor. This embodiment demonstrates the diverse usability of the apparatus according to the invention. In addition to determining the temperature of the brushless direct-current motor, this makes it possible to obtain information on the angular positions of the rotor with respect to the phase windings, i.e. the apparatus according to the invention can be used for commutating the rotating field of the phase windings.

In accordance with an added feature of the invention, the logic unit determines the rotational speed of the brushless direct-current motor on the basis of the zero crossings of the output voltage or voltages from the Hall-effect element or elements.

In accordance with an additional feature of the invention, in addition to this determination of the rotational speed, the logic unit determines the direction of rotation of the brushless direct-current motor from the succession of combinations of output signals from the Hall-effect elements or from the relative positions of the output signals from the Hall-effect elements.

In accordance with yet another feature of the invention, in addition to determining the temperature, the rotational speed, the direction of rotation and the commutation, in order to provide information with regard to the partial demagnetization of the rotor, the Hall-effect element is disposed at one end of the rotor. For this purpose, the logic unit compares the output voltage from a Hall-effect element with a correspondingly stored specified-value curve. Irregular deviations from the specified-value curve are interpreted by the logic unit as a sign of the demagnetization or partial demagnetization of the rotor. The operating personnel are made aware of this fault by means of an audible warning or by the switching-off of the motor.

In accordance with yet a further feature of the invention, the ipermanently magnetic segments of the rotor are formed of ferromagnetic material. As compared with ferrimagnetic material, ferrimagnetic material has the advantage of having a high electrical resistance in alternating fields, as a result of which it is possible to keep eddy-current losses very low.

In accordance with yet an added feature of the invention, the permanently magnetic segments of the rotor are formed of ferromagnetic material and a ferrimagnetic disc is attached to the end surface of the armature, with the number of poles and polarity of the disc being identical with the number of poles and polarity of the rotor of the brushless direct-current motor.

In accordance with yet an additional feature of the invention, the individual permanently magnetic or ferrimagnetic segments of the rotor or the segments of the ferrimagnetic disc attached to the end surface of the rotor, themselves in turn include regions of differing magnetization.

Therefore, in accordance with again another feature of the invention, the differing magnetization within the segments is achieved by a weakening of the magnetization of the pole segments in the intended regions.

In accordance with a concomitant feature of the invention, the differing magnetization within the segments is achieved by material removal and thus by a widening of an air gap between the segments and the Hall-effect elements in the regions provided. As a result of this repeated subdivision of the magnetized segments, it is possible to increase the resolution with regard to the determination of the rotational speed at will.

Other features which are considered as characteristic for the invention are set forth in the appended claims.

Although the invention is illustrated and described herein as embodied in an apparatus for measuring at least one state variable of a brushless direct-current motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic, top-plan view of a rotor of a brushless direct-current motor and a Hall-effect element;

FIG. 2a is a graph showing an output voltage $U_H(t)$ from a Hall-effect element at two different temperatures, with the Hall-effect element not being operated in the saturation state;

FIG. 2b is a graph showing the output voltage $U_H(t)$ from a Hall-effect element at two different temperatures, with the Hall-effect element being operated in the saturation state;

Figure 6A:
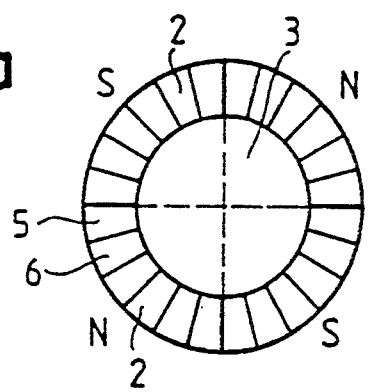
FIG. 6a is a top-plan view of the end surface of a rotor, with the individual permanently magnetic segments being subdivided in turn by differing degrees of magnetization.
Figure 6B:
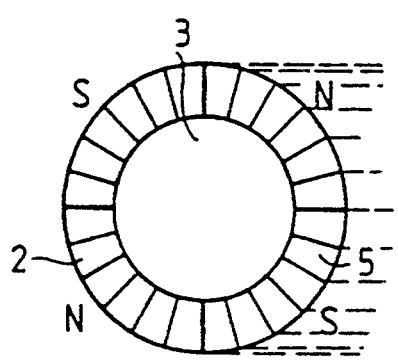
Figure 6C:
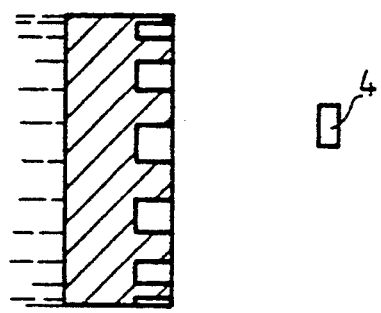
Figure 7:
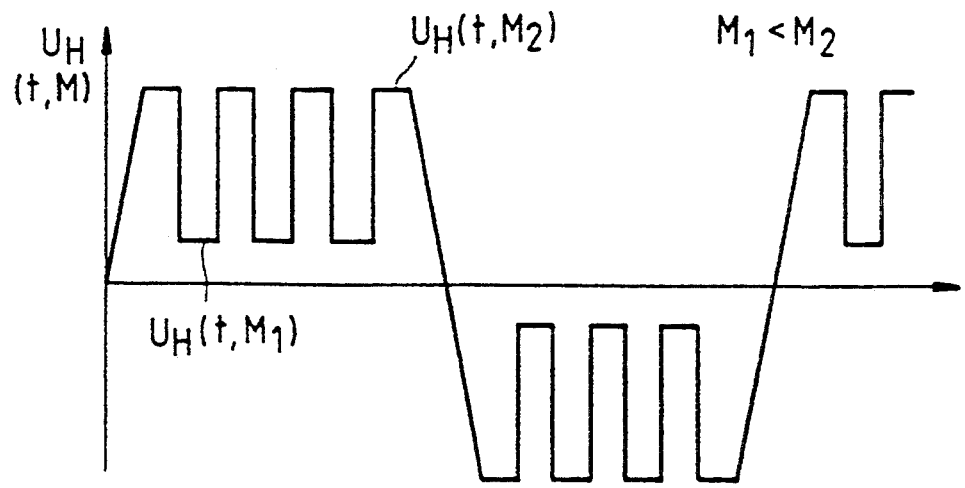
Figure 8:
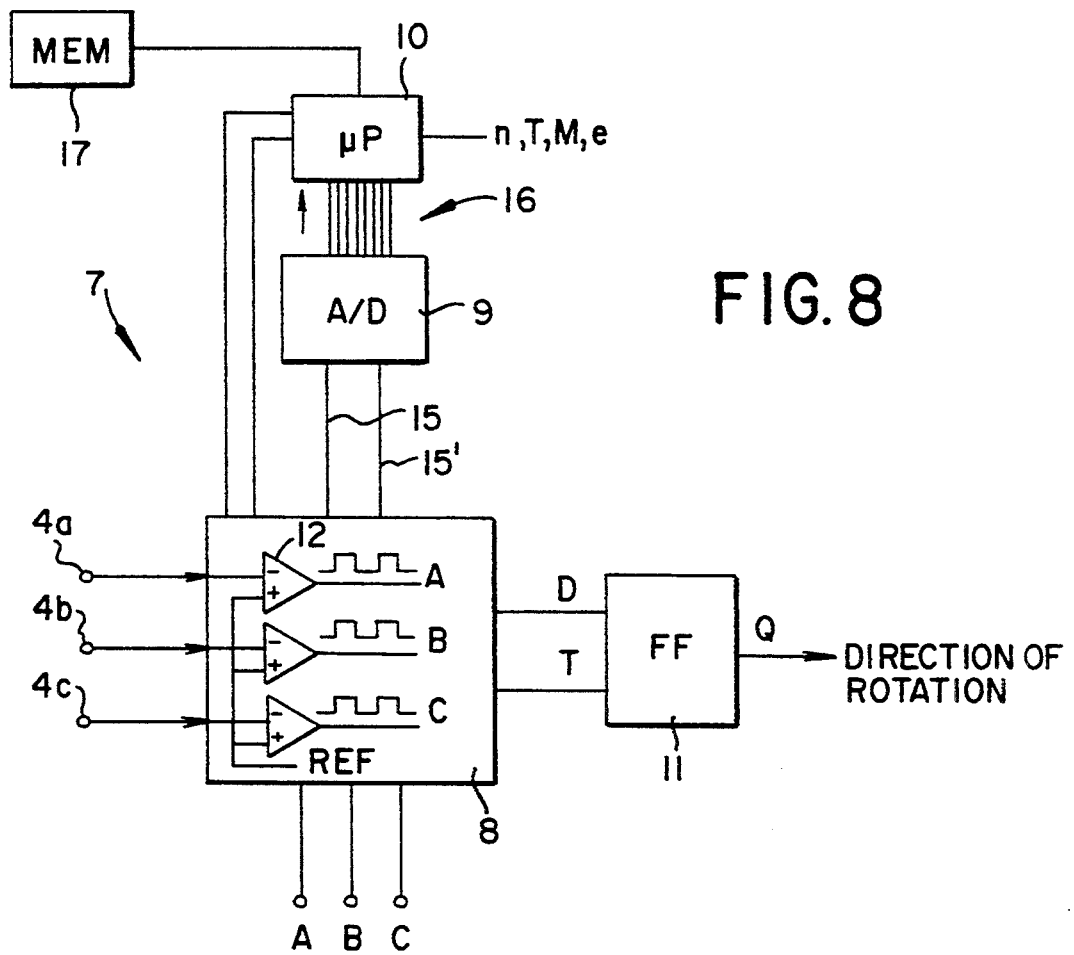
Figure 10:
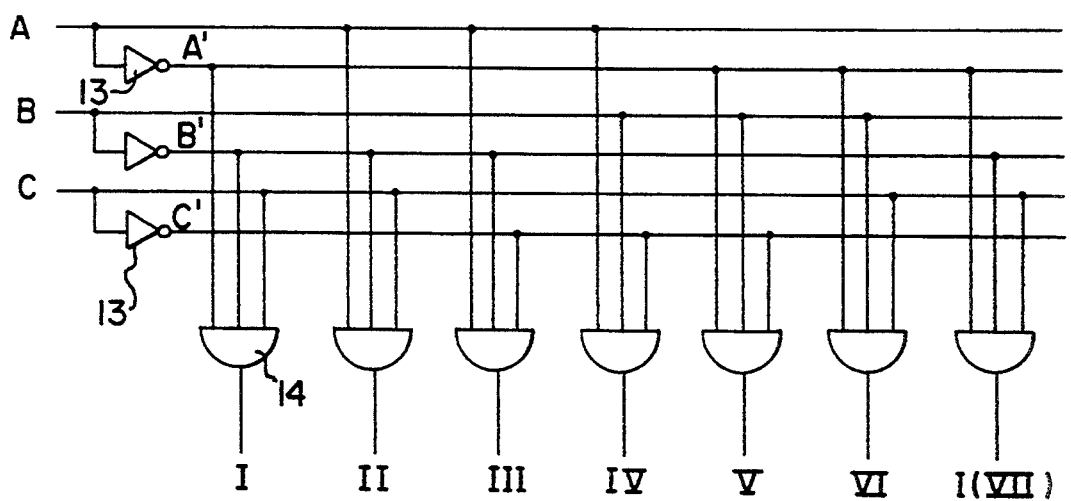
Figure 9:
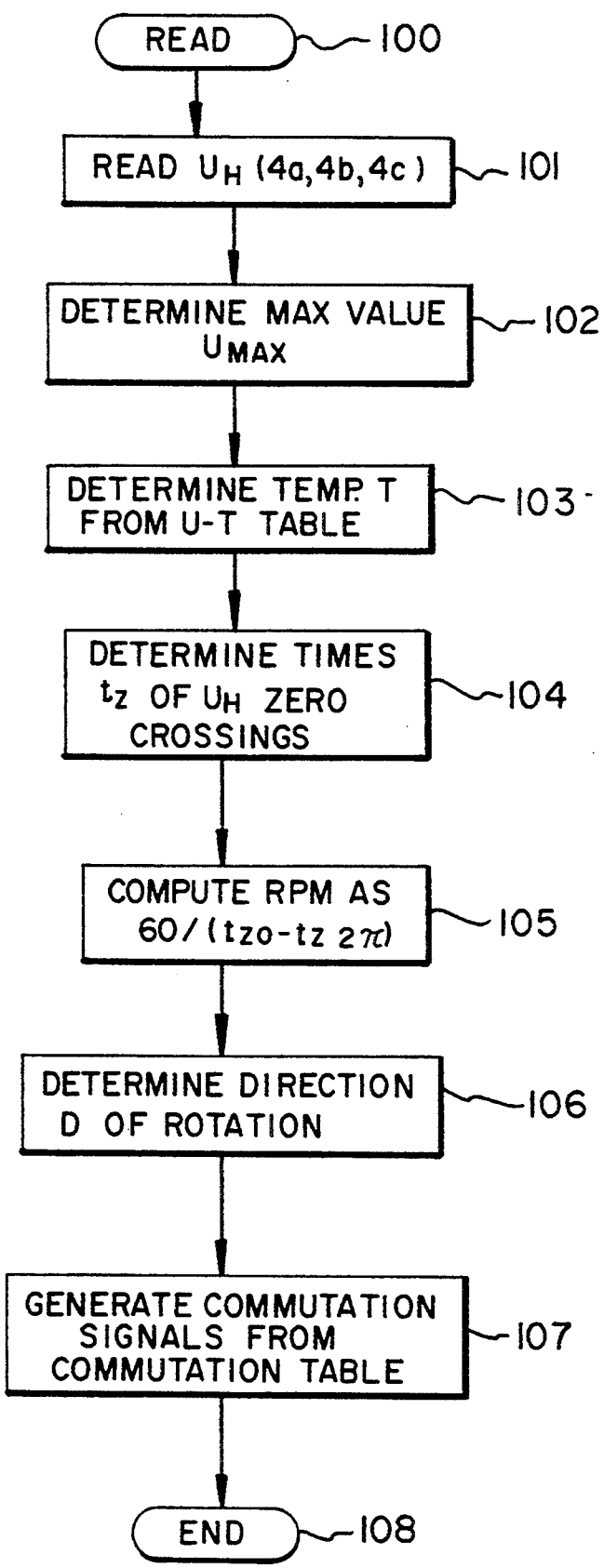
Figure 11:
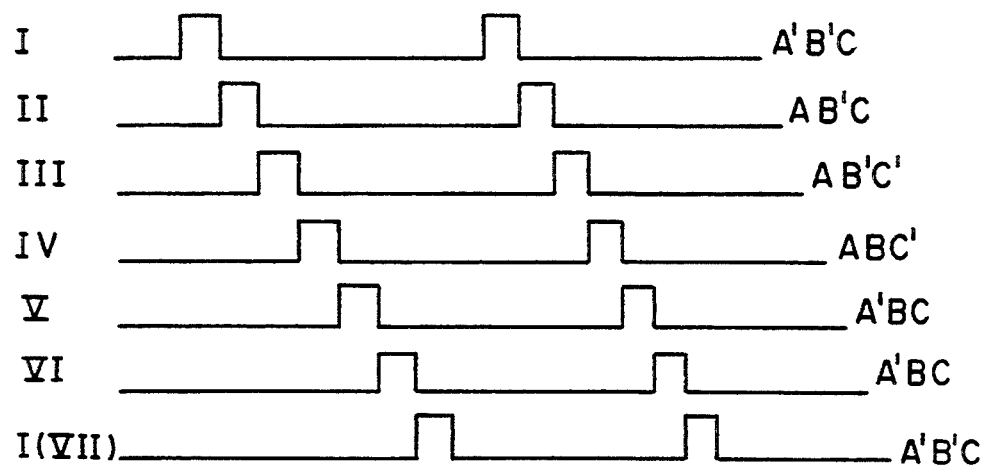

FIGS. 6b and 6c includes a top-plan view and a cross-sectional view of the end surface of a rotor, with the individual permanently magnetic segments being subdivided in turn by material removal in individual segment regions, and a Hall-effect element is also shown;

FIG. 7 is a graph showing the variation with respect to time of the output voltage $U_H(t)$ from a Hall-effect element according to FIG. 6a and/or FIG. 6b and 6c;

FIG. 8 is a schematic and block circuit diagram of a circuit configuration for determining the operating states of a motor;

FIG. 9 is a flow chart showing the steps in determining temperatures, RPM, direction of rotation and commutation signals from the outputs of the Hall detectors;

FIG. 10 is a circuit diagram showing a determination of commutation signals from the outputs of the Hall detectors;

FIG. 11 is a graph of the commutation signals; and

Figure 12:
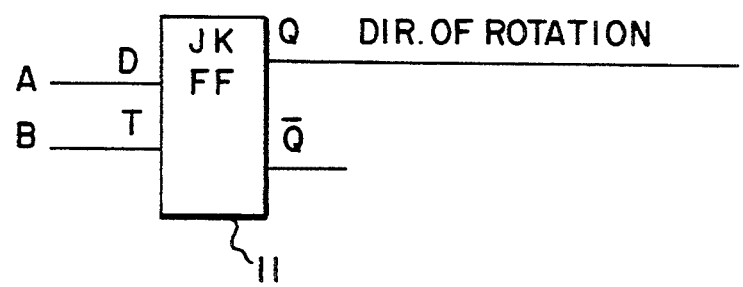

FIG. 12 is a block circuit diagram of a circuit for determining a direction of rotation.

Referring now to the figures of the drawing in detail and first, particularly, to FIG. 1 thereof, there is seen a top view of an end surface of a rotor 1 of a brushless direct-current motor. Six permanently magnetic segments 2 are disposed on a rotor shaft 3. The rotor shaft 3 is normally formed of steel. The permanently magnetic segments 2 are made from a ferromagnetic or ferrimagnetic material. Both materials are temperature-dependent in the afore-described manner.

A Hall-effect element 4 is disposed at a fixed distance from the periphery or from the end surface of the rotor 1. An output voltage $U_H(t)$ from the Hall-effect element varies as a function of the magnetization of the permanently magnetic segments 2. Since the magnetization M of the permanently magnetic segments 2 changes as a function of temperature T, the output voltage $U_H(t)$ of the Hall-effect element 4 contains information on temperature changes of the rotor 1 with respect to a defined initial state.

FIG. 2a shows the output voltage $U_H(t)$ of a Hall-effect element 4 at two different temperatures T1, T2. As is shown in FIG. 2a, the Hall-effect element 4 is not operated in the saturation state. In this case, the output voltage $U_H(t)$ of the Hall-effect element 4 has a sinusoidal waveshape. The amplitude of the sinusoidal signal $U_H(t)$ varies as a function of the temperature.

$U_H(T_1)$ represents the output voltage of the Hall-effect element 4 when the motor is cold. The motor warms up during operation. As a consequence of the increase in temperature, there is a change in the magnetization M of the permanently magnetic segments 2, namely it becomes smaller. This weakening of the magnetic field of the permanently magnetic segments 2 is reflected in a sinusoidal output voltage $U_H(t; T_2)$, the amplitude of which is smaller than that of the output voltage $U_H(t; T_1)$ of the Hall-effect element 4 when the motor is cold. If the variation of the output voltage $U_H(t)$ of the Hall-effect element 4 as a function of temperature T is known, it is possible to determine the temperature change of the motor from the difference of the amplitude maxima of $U_H(t; T_1)$ and $U_H(t; T_2)$. Of course, this presupposes a constant distance between the rotor 1 and the Hall-effect element 4.

FIG. 2b shows a further alternative way in which the output voltage $U_H(t)$ of a Hall-effect element 4 can be used to determine a change in the temperature of a rotor 1. FIG. 2a shows the output voltage $U_H(t)$ of a Hall-effect element 4, likewise at two different temperatures $T_1$, $T_2$. In contrast to FIG. 2a, however, in this case the Hall-effect element 4 is operated in the saturation state. The output voltages $U_H(t)$ have a trapezoidal waveshape. In this case, a change in temperature of the rotor 1 is determined not by the evaluation of the maxima of the amplitudes, but through the slope of the edges of the trapezoidal output voltages $U_H(t)$ at the different temperatures $T_1$, $T_2$. It can be seen from FIG. 2b that the edge rise or fall at low temperatures, is steeper than at higher temperatures. If the temperature-dependence of the slope: of the output voltage $U_H(t)$ is established beforehand, it is also possible in this manner to determine changes in temperature.

Figure 3A:
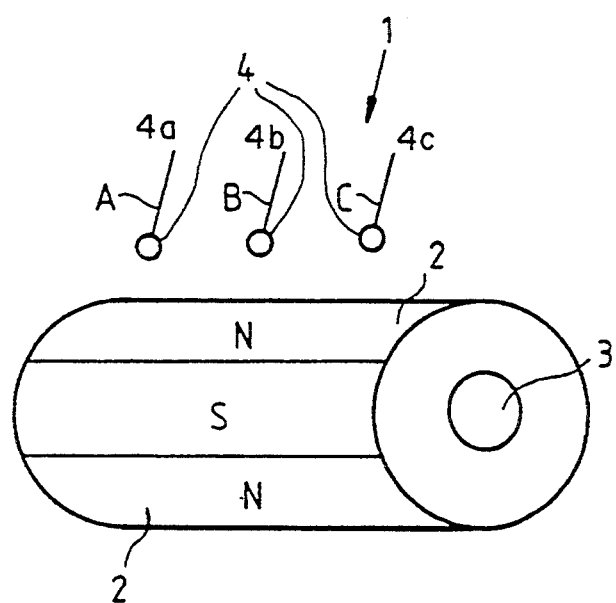
FIG. 3a is a perspective view of a six-pole rotor, with three Hall-effect elements being disposed at 80° relative to one another on the periphery of the rotor.
Figure 3B:
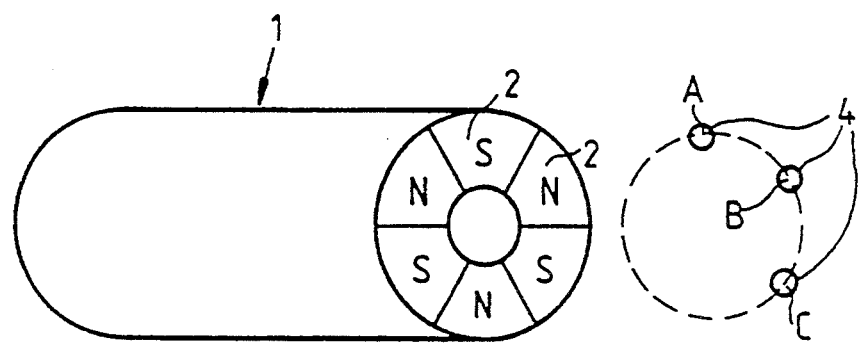
FIG. 3b is a perspective view of a six-pole rotor, with three Hall-effect elements being disposed at 80° relative to one another on an end surface of the rotor.

FIGS. 3a and 3b show advantageous further developments of the device according to the invention, with it being possible to also determine the operating variables of rotational speed and direction of rotation, as well as to obtain information on commutation, in addition to determining the temperature. FIG. 3a shows a six-pole rotor 1. The permanently magnetic segments 2 of the rotor 1 are associated with Hall-effect elements 4, which are disposed at 80° relative to one another in the circumferential direction with respect to the outer cylindrical surface of the rotor 1.

FIG. 3b shows an alternative possibility for the configuration of the Hall-effect elements 4, in which case the Hall-effect elements 4 are disposed on the end surface of the rotor 1, and are likewise at 80° relative to one another in the circumferential direction.

Figure 4:
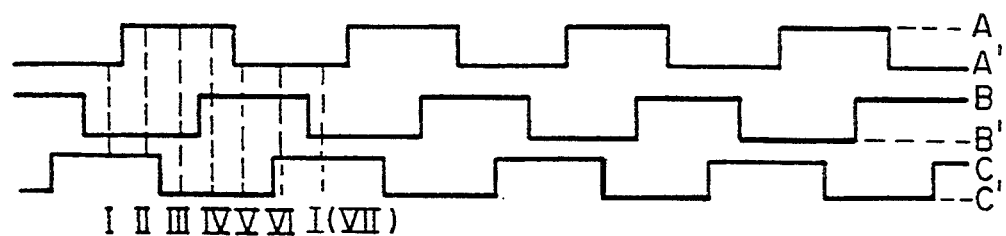
FIG. 4 is a graph of a commutation table showing output signals from the three Hall-effect elements, with the Hall-effect elements being operated in the saturation state.

FIG. 4 shows output signals A, B, C and their complements A', B', C', for the individual Hall-effect elements 4 according to FIG. 3a and FIG. 3b. The Hall-effect elements 4 are operated in the saturation state and the sinusoidal output signals from the Hall-effect elements 4 have been converted by a logic unit into square-wave pulses. As can be seen from designations I to VI in FIG. 4 and in FIG. 11, it is possible, by performing simple logical operations on the output signals from the Hall-effect elements 4, as is shown in FIG. 10, to obtain seven different states. These seven different states are used to commutate the current to the phase windings of the rotor 1.

In a six-pole, brushless direct-current motor, there are 18 changes in output signal per revolution of the rotor. These changes can be used to determine the rotational speed of the rotor 1.

It is furthermore possible to obtain information on the direction of rotation of the rotor from two output signals $U_H(t)$ of the Hall-effect elements 4. Of course, on the basis of the succession of the logically linked output signals, it is also possible to obtain the information on direction of rotation with the aid of the three output signals from the Hall-effect elements 4.

FIG. 12 shows that a JK flip-flop 11 can be used to determine the direction of the rotation, for example by connecting the signal A shown in FIG. 4 to a data input D and an immediately following phase signal B to a trigger input T. Since the negative going edge of the T input will set a flip-flop output Q according to the state A of the data input, it follows that the direction of the signals shown in FIG. 4 will cause the output Q to go low. If the direction of rotation is reversed, the output Q will go high, since then the signal B will go low when the signal A is high.

In addition to the information on temperature, rotational speed and direction of rotation and in addition to the information on commutation, the output voltage $U_H(t)$ of the Hall-effect element or elements 4 also contains information on the degree of magnetization of the permanently magnetic segments 2 of the rotor 1.

Figure 5A:
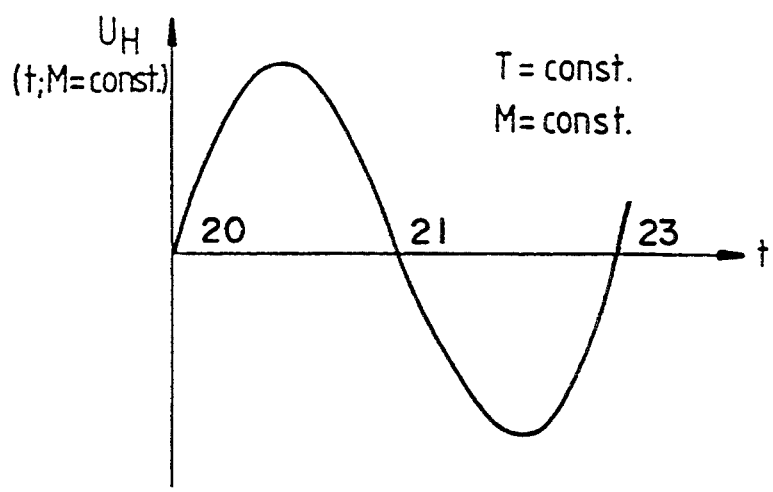
FIG. 5a is a graph of the output voltage from a Hall-effect element in the case of a magnetization M.

FIG. 5a shows the output voltage $U_H(t)$ of a Hall-effect element 4 at the temperature T and with the magnetization M of the permanently magnetic segments 2 of the rotor 1.

Figure 5B:
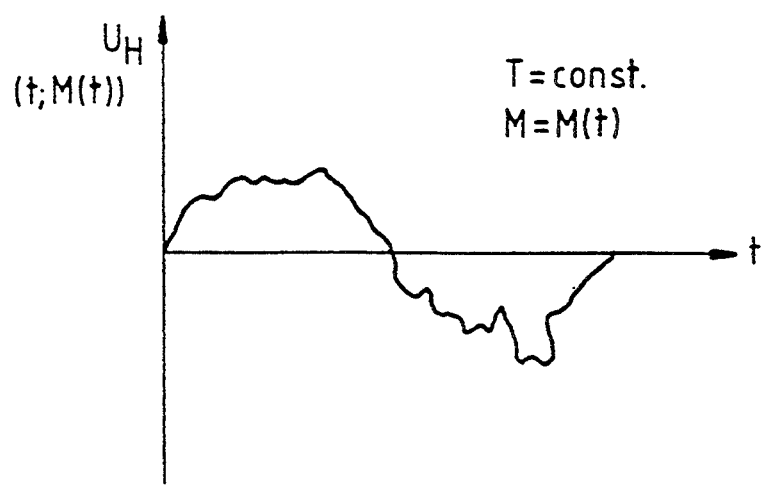
FIG. 5b is a graph of the output voltage from a Hall-effect element in the case of demagnetization or partial demagnetization.

FIG. 5b shows the output voltage $U_H(t)$ of the Hall-effect element 4 in the case of demagnetization or partial demagnetization. If all of the other parameters, such as temperature T and, naturally, the distance of the Hall-effect element 4 from the permanently magnetic segments 2, are kept constant, then it is possible to clearly detect the demagnetization or partial demagnetization of the permanently magnetic segments 2 of the rotor 1, from the waveshape of the output voltage $U_H(t)$ of the Hall-effect element 4. Operating personnel are notified of this defect that has occurred on the motor, through an appropriate interface.

The rotational speed can be obtained by determining the time difference between successive zero crossings Z0, Z1, etc. as is shown in FIG. 2. It follows that the RPM is equal to a time Z3 less the time Z0, inverted and multiplied by 60.

FIGS. 6a and 6b show two examples of a way in which more accurate information on rotational speed can be obtained. For this purpose, the individual permanently magnetic segments 2 of the rotor 1 are subdivided, in turn, into regions 5 of lower magnetization and regions 6 of higher magnetization. This subdivision is accomplished in FIG. 6a by different strengths of magnetization of the regions 5, 6.

In FIG. 6b, the same effect is achieved by increasing the distance with respect to the Hall-effect element 4 through material removal in the regions 5 of the permanently magnetic segments 2.

FIG. 7 is a graph which plots the resulting output voltage $U_H(t)$ of the Hall-effect element 4 according to the configurations shown in FIG. 6a and/or 6b. It can be seen from the trapezoidal waveshape of the output voltage $U_H(t)$ that the Hall-effect element 4 is being operated in this case in the saturation state. The weaker magnetization in the regions 5 of the permanently magnetic segments 2 is made noticeable in dips in the trapezoidal output voltage $U_H(t)$. It is possible for these dips in the output voltage $U_H(t)$ of the Hall-effect element 4 to be used for a better degree of resolution with regard to the determination of the rotational speed, through the use of a logic unit.

FIG. 8 discloses a circuit configuration for determining the individual operating states of a rotor 1 of a brushless direct-current motor. The output voltages 4a, 4b and 4c of the Hall-effect elements 4 are evaluated by a logic unit 7 in such a manner that they allow the determination of individual operating states of the brushless direct-current motor. These operating states relate to the temperature, the rotational speed, the direction of rotation, the information on commutation for the energization of the phase windings and the magnetization of the rotor 1.

The output voltages 4a, 4b and 4c of the Hall-effect elements 4 are supplied to a signal-detection and control unit 8 which is connected to the JK flip-flop 11. The control unit 8 contains comparators 12 which are each connected to a respective output 4a, 4b and 4c of the Hall-effect elements or detectors 4. The comparators convert the Hall signals into square wave signals A, B, C by comparing them with a reference signal REF. The square wave signals A, B, C are further processed in the circuit shown in FIG. 10, in which inverters 13 generate an inverse function A', B' an C' of the signals A, B and C. In a well-known manner, an array of AND gates 14 in turn decode the signals A, B, C and A', B', C' into a sequence of signals I–VII which are suitable for generating the commutation signals for a brushless motor.

The control circuit 8 is advantageously connected through conductors 15, 15' to an A/D converter 9, which is accessed sequentially through a non-illustrated multiplexing configuration by the signals 4a, 4b, 4c. The A/D converter 9 transmits the wave shapes of the signals 4a, 4b, 4c through 8 bit lines 16 to a microprocessor 10. Through the use of a suitable signal-processing algorithm of conventional format, the microprocessor 10 determines the parameters n (RPM), T (temperature), M (magnetization) and C (commutating signals).

The RPM is determined as described above on the basis of the timing between zero crossings Zn, the temperature is determined by entering the Hall signal magnitude into a temperature table in a memory 17 associated with the microprocessor 10 and the commutating signals C can be obtained by developing the sequence signals I–VII shown in FIG. 10.

The signal-detection and control unit 8 determines the commutation signals for the phase windings A, B, C of the brushless direct-current motor from the output voltages $U_H(t)$ or 4a, 4b, 4c. Furthermore, the signal-detection and control unit 8 determines the direction of rotation of the rotor 1 of the brushless direct-current motor from at least two of the output voltages 4a, 4b, 4c of the Hall-effect elements 4.

The output voltage $U_H(t)$ from a Hall-effect sensor 4 provides sufficient information for the determination of the rotational speed, temperature and magnetization of the brushless direct-current motor. The analog output voltage $U_H(t)$ from the Hall-effect sensor 4 is digitized by means of the A/D converter 9 and is forwarded to the processor 10. In addition, the signal-detection and control unit 8 provides the processor 10 with information on the sign of the corresponding output voltage $U_H(t)$ from the Hall-effect element 4.

As was already previously described, the temperature of the brushless direct-current motor is determined by using previously stored, temperature-dependent output-voltage characteristic curves of the Hall-effect element 4.

A change in the magnetization of the permanently magnetic segments 2 of the rotor 1 is detected when substantial changes occur in the output signal $U_H(t)$ from the Hall-effect element 4, with the parameters of temperature and distance between the Hall-effect element 4 and the rotor 1 being constant.

The rotational speed is determined on the basis of the occurring maxima, minima or zero crossings of the output voltage $U_H(t)$ from the Hall-effect element 4 per revolution.

FIG. 9 is a flow chart showing the steps performed according to the invention. After a step 100, the values $U_H$ or 4a, 4b, 4c are determined from the Hall detectors or elements 4 in a step 101. According to one of the methods described above, a maximum value $U_{max}$ is determined and the temperature is read from a temperature table in steps 102 and 103. Next, the timing of the zero crossings on one of the Hall signals is determined, and the RPM is computed in steps 104 and 105. The direction of rotation D is then determined in a step 106 by means of two of the Hall signals, by determining their phase relation signal, as was described above. Finally, the commutation signals are determined in a step 107 as is shown in FIG. 10, and the program ends in a step 108.

We claim:

1. An apparatus for determining at least one state of a brushless direct-current motor comprising a rotor with 2 * n pole segments, wherein n is a positive integer (n=1, 2, 3 ...), the 2 * n pole segments being composed of a permanently magnetic material for generating a magnetic field being divided into regions of magnetic fields of different strengths, at least one Hall-effect element being operated in magnetic saturation, disposed relative to the rotor so that the magnetic field of the pole segments generates an output voltage of the Hall-effect element being equal to $V_H(t)$, and a logic unit for receiving the output voltage from the Hall-effect element in the form of periodic oscillations of the output voltage $V_H(t)$, and wherein the rate of increase on the oscillations of the voltage $V_H(t)$ indicates the temperature of the brushless direct-current motor, wherein the periodic oscillations indicate the RPM of the motor, and wherein the maximum voltage of the output voltage $V_H(t)$ indicates one of an end magnetization and a partial magnetization of the rotor.

2. The apparatus according to claim 1, wherein said permanently magnetic segments are formed of ferromagnetic material.

3. The apparatus according to claim 1, wherein said at least one Hall-effect element is n Hall-effect elements with which said 2 * n pole segments of the brushless direct-current motor are associated under defined angular positions, said logic unit performs logical operations on the output signals from said Hall-effect elements, and said logic unit determines a respective angular position of the rotor and controls a commutation of phase windings according to the determined angular positions of the rotor.

4. The apparatus according to claim 1, wherein said logic unit determines a rotational speed of the brushless direct-current motor on the basis of zero crossings of the output voltage from said at least one Hall-effect element, and said logic unit determines a direction of rotation of the brushless direct-current motor from a succession of combinations of the output signals from said at least one Hall-effect element.

5. The apparatus according to claim 1, wherein said at least one Hall-effect element is at least two Hall-effect elements, and said logic unit determines a direction of rotation on the basis of relative positions of combinations of the output signals from said at least two Hall-effect elements.

6. The apparatus according to claim 1, wherein said permanently magnetic segments of the rotor are formed of ferromagnetic material, and including a disc made of ferromagnetic material being attached to an end surface of the rotor, said disc having a number of poles and polarity being identical with the rotor of the brushless direct-current motor.

7. The apparatus according to claim 1, wherein said individual segments of the rotor include regions of different magnetization.

8. The apparatus according to claim 8, wherein said ferromagnetic disc attached to the end surface of the rotor has segments including regions of different magnetization.

9. The apparatus according to claim 7, wherein said regions within said segments are provided with different magnetizations by weakening the magnetization in some of said regions.

10. The apparatus according to claim 8, wherein said regions within said segments are provided with different magnetizations by weakening the magnetization in some of said regions.

11. The apparatus according to claim 7, wherein said at least one Hall-effect element is spaced from said regions within said segments defining an air gap therebetween, and said regions within said segments are provided with different magnetizations by removing material for increasing the air gap between said at least one Hall-effect element and some of said regions.

12. The apparatus according to claim 8, wherein said at least one Hall-effect element is spaced from said regions within said segments defining an air gap therebetween, and said regions within said segments are provided with different magnetizations by removing material for increasing the air gap between said at least one Hall-effect element and some of said regions.

* * * * *